United States Patent

Rueby et al.

Patent Number: 5,903,681
Date of Patent: May 11, 1999

[54] REDUCING EDGE ARTIFACTS ON A DIGITAL PRINTER

[75] Inventors: Christopher Rueby, North Chili; Kevin E. Spaulding, Spencerport, both of N.Y.

[73] Assignee: Eastman Kodak Company, Rochester, N.Y.

[21] Appl. No.: 08/685,740

[22] Filed: Jul. 24, 1996

[51] Int. Cl.⁶ .................................................. G06K 9/40
[52] U.S. Cl. ........................................ 382/266; 382/268
[58] Field of Search ...................... 382/254, 266, 382/268, 269, 275, 199

[56] References Cited

U.S. PATENT DOCUMENTS

| | | | |
|---|---|---|---|
| 4,941,190 | 7/1990 | Joyce | 382/288 |
| 5,319,391 | 6/1994 | Takahashi et al. | 346/76 PH |
| 5,390,264 | 2/1995 | Ishihara et al. | 382/266 |
| 5,710,840 | 1/1998 | Hideshima et al. | 382/254 |

*Primary Examiner*—Jose L. Couso
*Assistant Examiner*—Matthew C. Bella
*Attorney, Agent, or Firm*—Raymond L. Owens

[57] ABSTRACT

An arrangment is disclosed for reducing edge artifacts produced when printing a digital image on a digital printer, which printer is capable of producing multiple output levels, said digital image being represented as a rectangular array of pixels. In this arrangement, the following steps are accomplished by: computing difference signals between a center pixel value and pixel values of a set of one or more neighboring pixels; determining a pixel correction value responsive to the computed difference signals; and computing a new center pixel value by modifying the center pixel value using the pixel correction value.

10 Claims, 5 Drawing Sheets

REDUCING EDGE ARTIFACTS ON A DIGITAL PRINTER

FIELD OF THE INVENTION

This invention pertains to the field of digital imaging, and more particularly to the field of reducing image artifacts produced by digital printers.

BACKGROUND OF THE INVENTION

Digital printers are devices that are used to produce hardcopy reproductions of digital images. Digital images are digital representation of an image, typically expressed as a rectangular array of pixel values, or as a set of encoded information that can be used to generate such an array of pixel values. Some printers are binary in nature, only being able to produce white and one other output level for any particular pixel. Other printers are capable of producing multiple output levels. Thermal dye transfer printers are one common type of digital printer that produce multiple output levels by varying the amount of heat applied to a thermal dye donor ribbon. Other types of printers would include digital silver halide printers, electrophotographic printers, and ink jet printers.

Color digital printers are used to produce color reproductions of color digital images. Typically color digital printers work by producing multiple color planes using different colorants for each color plane. Commonly, the color planes are cyan, magenta, and yellow (CMY), or cyan, magenta, yellow, and black (CMYK), although many color printers use other special colorants as well.

The images formed by digital printers frequently suffer from a number of artifacts. Artifacts can be defined as undesirable image characteristics. One such class of artifacts is edge artifacts. Edge artifacts occur on the boundaries between various image regions. Although there are a number of kinds of edge artifacts, many of them result when a digital printer produces an undesirable density profile at the edge.

Figure 1A:
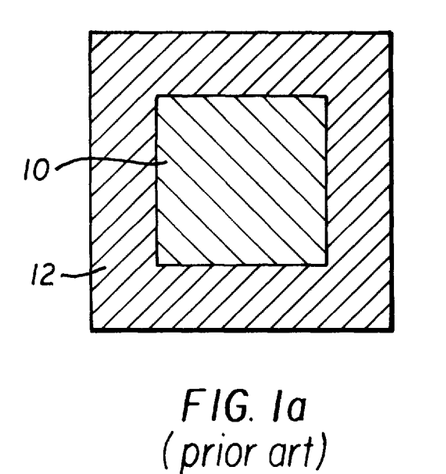
Figure 1B:
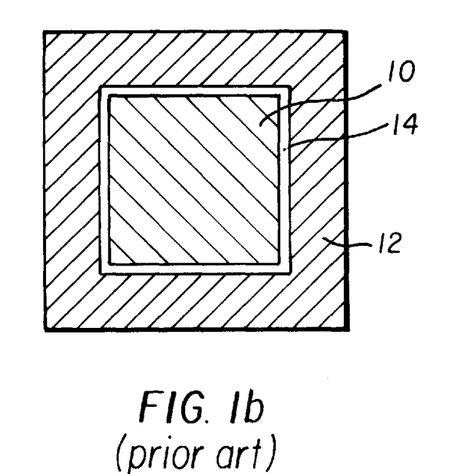
Figure 2A:
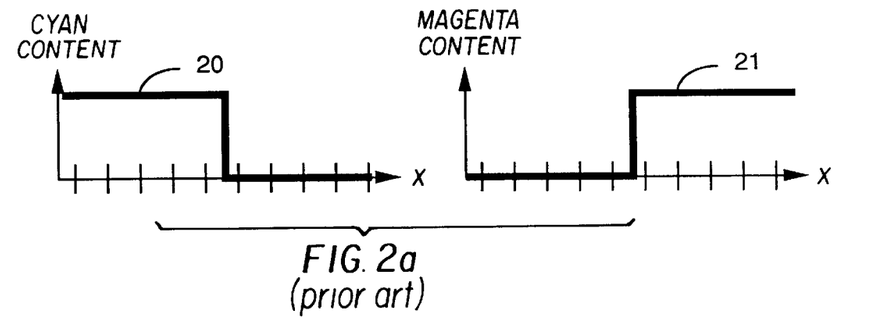
Figure 2B:
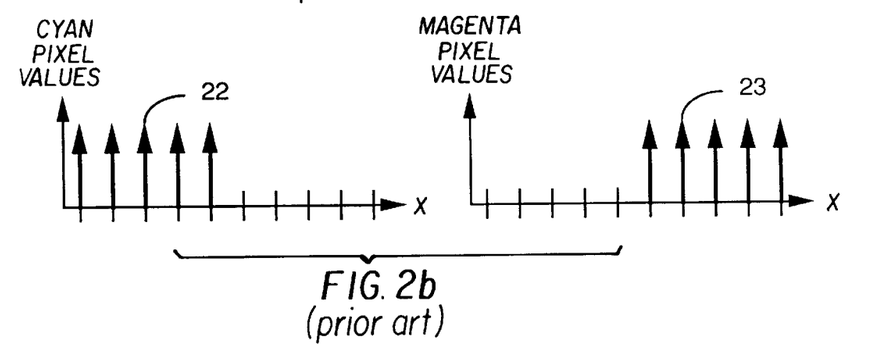
Figure 2C:
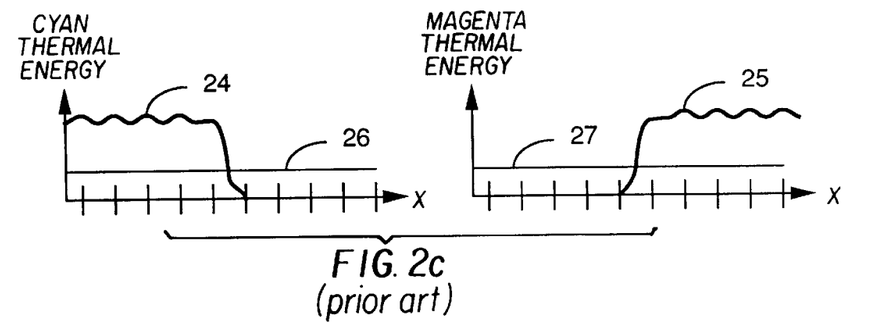
Figure 2D:
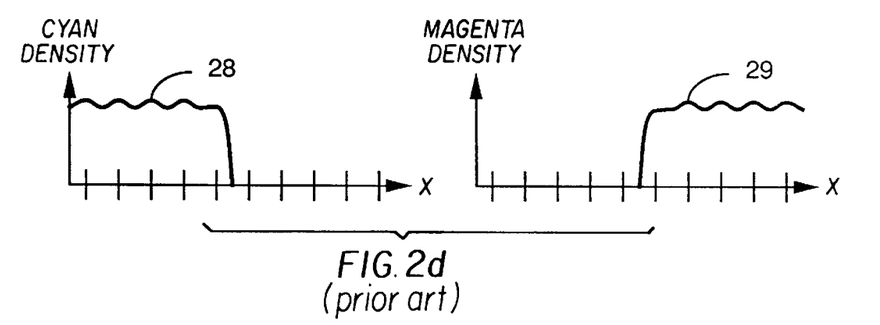

For example, consider FIG. 1 (a) which shows one type of image that is prone to exhibit edge artifacts. The image consists of an inner square 10 of one color, surrounded by an outer square 12 of another color. For the purposes of this example, consider the inner square to be cyan, and the outer square to be magenta. Therefore if this image is printed with a CMY printer the inner square will be printed using the cyan colorant, and the outer square will be printed using the magenta colorant. Frequently when this image is printed, an edge artifact occurs where the boundary between the outer square and the inner is not accurately reproduced. This is shown figuratively in FIG. 1(b) which illustrates an edge artifact 14 in the form of a white ring around the inner square. Depending on the severity of the artifact, the ring may be white, or it may simply be lighter than the surrounding patches.

Figure 3:
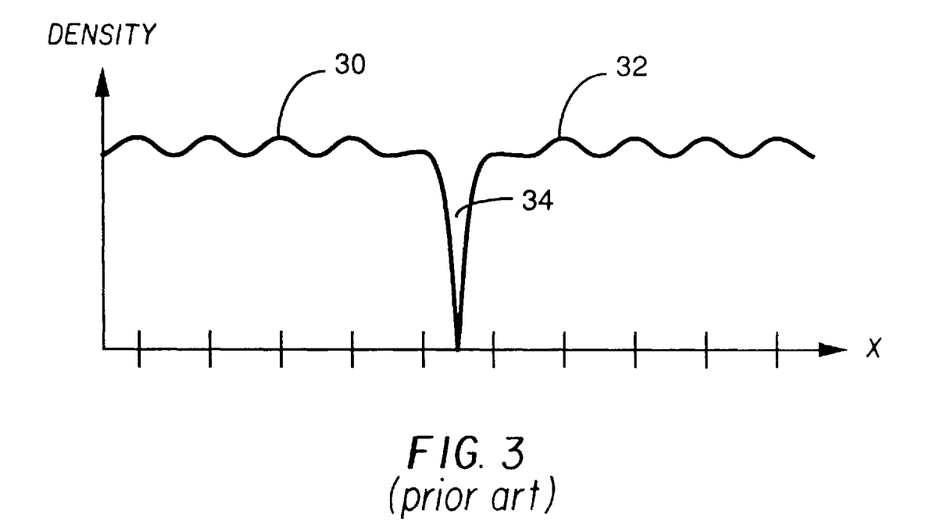
FIG. 3 is a diagram showing the edge artifact resulting from the steps of FIG. 2.

One cause for the edge artifact shown in FIG. 1, is illustrated in FIGS. 2 (a)–(d). Consider an edge in the image between a cyan region on the left, and a magenta region on the right. FIG. 2(a) shows graphs of the cyan image content 20, and the magenta image content 21, as a function of the image position x. For x positions to the left, there is cyan image content, but no magenta image content. For x positions to the right, the opposite is true. The corresponding cyan pixel values 22 and magenta pixel values 23 used to represent the image content for the cyan and magenta color planes, respectively, are shown in FIG. 2(b). If this image were reproduced on a thermal dye transfer color digital printer, the pixel values will be converted into thermal energy applied to the thermal dye donor ribbon to transfer dye to the receiver layer. Figurative representations of the cyan thermal energy 24 and the magenta thermal energy 25 are shown in FIG. 2(c). It can be seen that the thermal energy profile for the uniform image regions is shown to be somewhat non-uniform, and that some of the thermal energy near the edges has dissipated to the nearby pixels. Also shown on the graphs are the cyan thermal threshold 26 and the magenta thermal threshold 27 corresponding to the thermal energy levels necessary to transfer dye. Energy levels below these thresholds will result in no dye transfer to the receiver layer. The resulting cyan density profile 28 and magenta density profile 29 are shown figuratively in FIG. 2(d). It can be seen that there is some non-uniformity across the uniform image regions, and that the edge profiles are different from the ideal edge profiles shown in FIG. 2(a). The result when the two color planes are superimposed is shown in FIG. 3. At the boundary between the cyan density profile 30, and the magenta density profile 32 there is an edge artifact 34 where the density falls to a much lower value, resulting in a white line similar to that shown in FIG. 1. Other edge artifacts which are closely related to this example include a thinning or a loss of density in narrow lines, and a rounding of corners on objects.

SUMMARY OF THE INVENTION

It is an object of this invention to provide digital image processing that can be used to reduce the appearance of edge artifacts on many digital printers.

The present invention includes method and apparatus which reduce edge artifacts produced when printing a digital image on a digital printer capable of producing multiple output levels.

The object is achieved in a method which includes the steps of computing difference signals between a center pixel value and pixel values of a set of one or more neighboring pixels, determining a pixel correction value responsive to the computed difference signals, and computing a new center pixel value by modifying the center pixel value using the pixel correction value.

The result of these steps is that the pixel values in the neighborhood of edges in the image are modified in such a way that the appearance of the edge artifacts are reduced.

In a preferred embodiment, this is accomplished by increasing the pixel values for the pixels that occur on the lighter side of an edge in the image.

Advantages

The present invention has the advantage that it reduces the appearance of edge artifacts on digital printers. Notably, it reduces the appearance of artifacts that frequently are produced on the boundary between regions of different color. Additionally, it can improve the reproduction of fine lines in an image.

Brief Description of the Drawings

FIGS. 1 (a)–(b) are diagrams showing a typical edge artifact;

FIGS. 2 (a)–(d) are diagrams showing the steps involved in the formation of an edge with cyan to the left, and magenta to the right;

FIGS. 7 (a)–(d) are diagrams showing the steps involved in the formation of an edge with cyan to the left, and magenta to the right according to the method of the present invention;

DETAILED DESCRIPTION OF THE INVENTION

Figure 4:
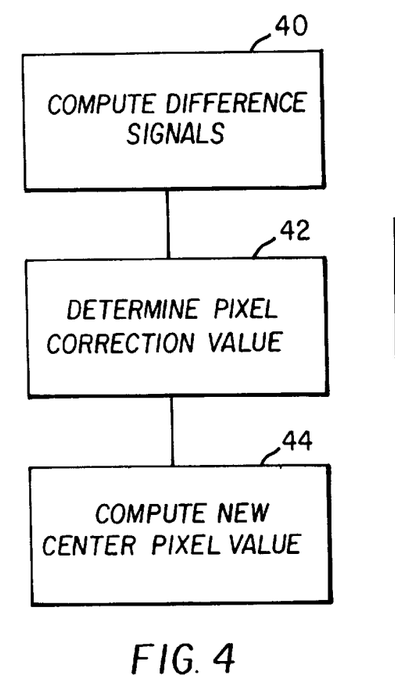
FIG. 4 is a diagram showing the method of the present invention.

Referring now to FIG. 4, the method of the present invention will be described. This method is applied to each of the pixels of a digital image. If the digital image is a color digital image, this method can be applied to each color plane of the digital image. For the purposes of this description, the current pixel which is being processed will be referred to as the center pixel, and other nearby pixels will be referred to as neighboring pixels. First a set of difference signals is determined using a difference signal computing step 40 by computing the difference between the center pixel and a set of neighboring pixels. Next, the difference signals are used to determine a pixel correction value using a pixel correction value determining step 42. The center pixel is then modified using the pixel correction value by the new center pixel value computing step 44. The result of these steps is that the pixel values in the neighborhood of edges in the image are modified in such a way that the appearance of the edge artifacts are reduced. In a preferred embodiment, this is accomplished by increasing the pixel values for the pixels that occur on the lighter side of an edge in the image.

Figure 5:
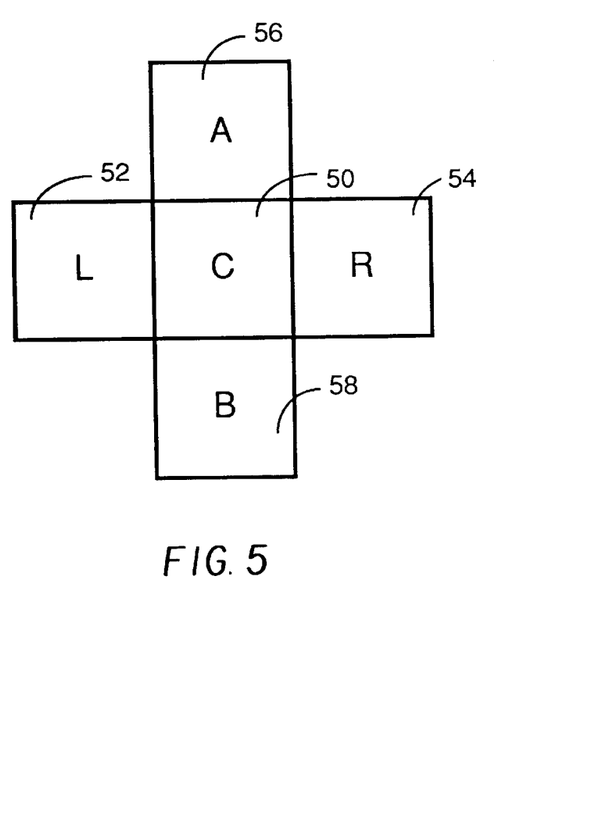
FIG. 5 is a diagram showing a group of neighboring pixels around a center pixel.

In a first embodiment of this invention the neighboring pixels comprise the immediately adjacent neighbors to the center pixel. This is shown in FIG. 5, where the center pixel 50 has a pixel value of C. The pixel immediately to the left of the center pixel 52 has a pixel value of L, the pixel immediately to the right of the center pixel 54 has a pixel value of R, the pixel immediately above the center pixel 56 has a pixel value of A, and the pixel immediately below the center pixel 58 has a pixel value of B. In alternate embodiments of the present invention a subset of these neighboring pixels can be used, or other nearby pixels can be included.

In this first embodiment of the present invention, the difference signals between the center pixel value and the neighboring pixels values are computed using a simple subtraction operation. The difference signal for the left pixel will therefore be given by the quantity $d_L = L - C$. Likewise, the difference signal for the right, above, and below pixels will be given by $d_R = R - C$, $d_A = A - C$, and $d_B = B - C$, respectively. For this example, we will assume the convention that large pixel values correspond to dark colors, and that small pixel values correspond to light colors. Therefore pixels which lie on the light side of an edge will yield corresponding difference signals that are positive, and pixels which lie on the dark side of an edge will yield corresponding difference signals that are negative.

In certain cases, it may also be desirable to compute difference signals between pairs of pixels that do not include the center pixel. For example, it may be desirable to compute the difference signal between the left pixel 52, and the next pixel immediately to the left of the left pixel. An example where this is useful will be shown later.

Once the difference signals have been computed, the next step is to determine a pixel correction value responsive to the difference signals. In this first embodiment of the present invention the pixel correction value is computed using the following pixel correction formula $$\Delta = \max(\Delta L, \Delta R, \Delta A, \Delta B) \quad (1)$$

where the $\Delta$ is the pixel correction value, max( ) is a function that returns the value of the argument with the largest value, and $$\Delta L = f_L(d_L) \quad (2a)$$

$$\Delta R = f_R(d_R) \quad (2b)$$

$$\Delta A = f_A(d_A) \quad (2c)$$

$$\Delta B = f_B(d_B) \quad (2d)$$

The functions $f_L$, $f_R$, $f_A$, and $f_B$ are difference signal functions used to process the difference signals between the center pixel and the left, right, above, and below pixels, respectively.

Figure 6:
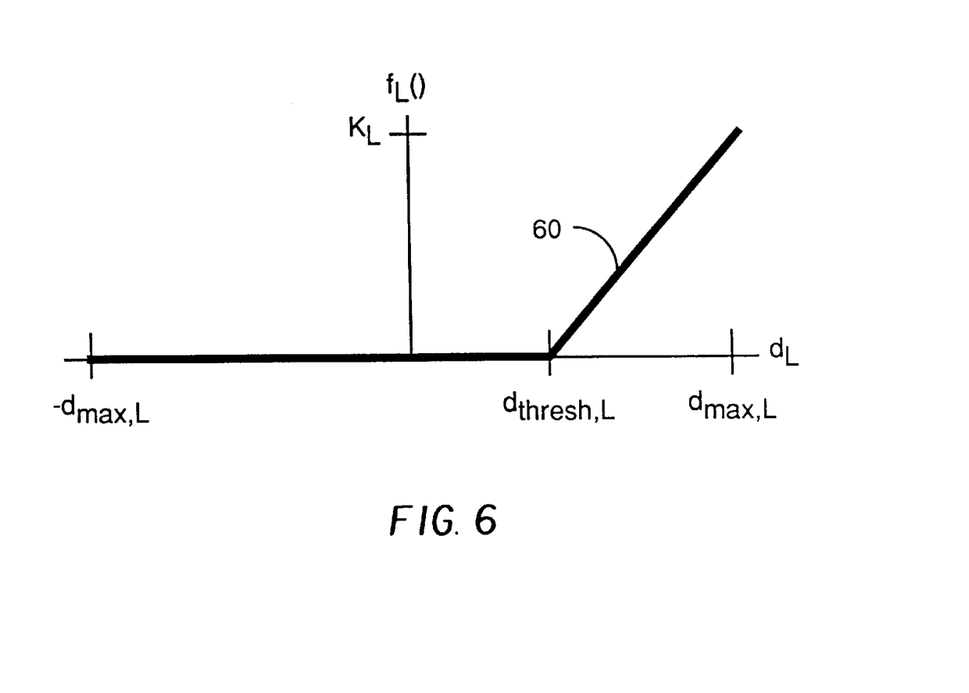
FIG. 6 is a graph of a typical difference signal function.

Many types of difference signal functions can be used. One form of difference signal function 60 that is frequently useful is shown in FIG. 6. This example shows a difference signal function to be applied to the difference signal for the left pixel, but the form of the function is appropriate for the other difference signals as well. This difference signal function can be expressed mathematically by the equation $$f_X(d_X) = \begin{cases} 0; & d_X \leq d_{thresh,X} \\ K_X \left( \dfrac{d_X - d_{thresh,X}}{d_{max,X} - d_{thresh,X}} \right); & d_X > d_{thresh,X} \end{cases} \quad (3)$$

where X is either L, R, A, or B, $d_X$ is the difference signal X–C, $d_{thresh,X}$ is a threshold difference signal value, $d_{max,X}$ is the maximum possible difference signal value, and $K_X$ is the value of $f_X(\ )$ for the maximum possible difference signal value.

It can be seen that for negative difference signals, the difference signal function shown in Eq. (3) returns a value of zero. This reflects the fact that our intent is to darken the pixels on the light side of an edge, but that we generally do not want to lighten the pixels on the dark side of an edge. Additionally, we may not want to modify the pixels which occur on low contrast edges. This is reflected by the fact that small difference signals which are below the threshold difference signal value also return a value of zero. For difference signal values corresponding to the maximum possible difference signal value, the difference signal function returns a value of $K_X$. For difference signal values between the threshold difference signal value and the maximum possible difference signal value, a linear difference signal function is used to provide a smooth transition.

For the case of a digital printer having 8-bits/pixel/color, the largest pixel value is typically 255. This means that the difference signal can range between a minimum value of –255 and a maximum value of 255. The values of the $d_{thresh,X}$ and the $K_X$ constants will generally need to be tuned for a given digital printer. In fact, they will frequently need to be individually tuned for each of the difference signals. In particular, the constants needed for the left and right difference signals will typically be different than those needed for the above and below difference signals due to the fact that many digital printers exhibit anisotropic edge artifacts. Typical values for the threshold difference signal values are in the range of 0 to 128, and typical values for $K_X$ are in the range of 5 to 200.

It can be seen that the basic function of the pixel correction. formula shown in Eq. (1), together with the difference signal functions shown in Eqs. (2) and (3), is to determine whether the center pixel lies on the light side of an edge, and if so compute a pixel correction value which can be used to modify the center pixel value. In this example, the center pixel value is modified by adding the pixel correction value to form a new center pixel value $$C'=C+\Delta \qquad (4)$$

where C' is the new center pixel value. The new center pixel value should be stored in a new image buffer so that the original center pixel value can be used when processing the nearby pixels which use the center pixel as a neighboring pixel. Depending on the exact form of the pixel correction formula, the modification of the center pixel can be accomplished by adding the pixel correction value to the center pixel value as shown in Eq. (4), or in other cases the center pixel value may be multiplied by the pixel correction value. Other more complex formulas for modifying the center pixel values with the pixel correction value are also possible.

Figure 7A:
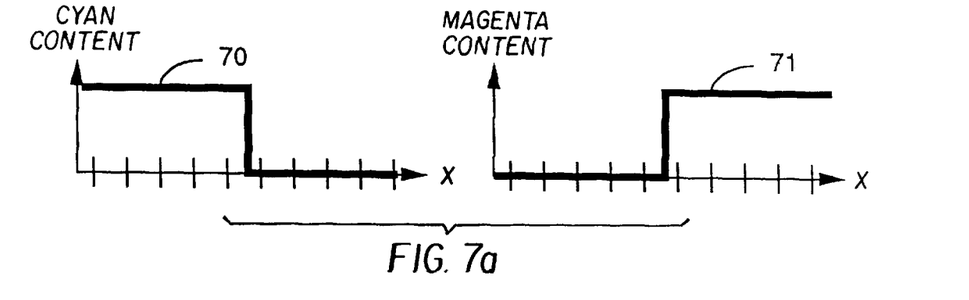
Figure 7B:
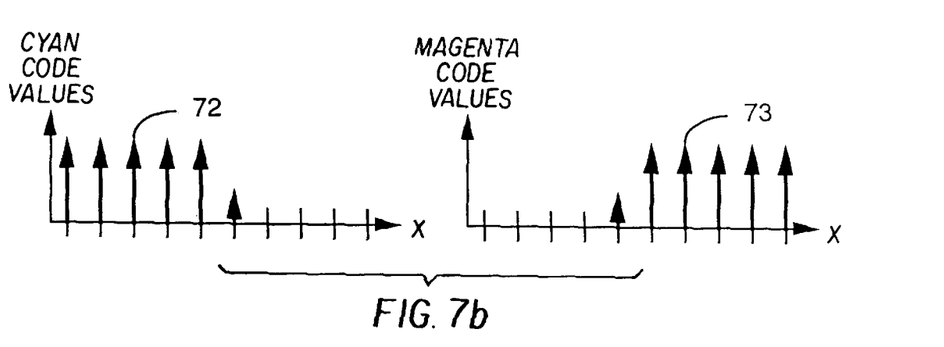
Figure 7C:
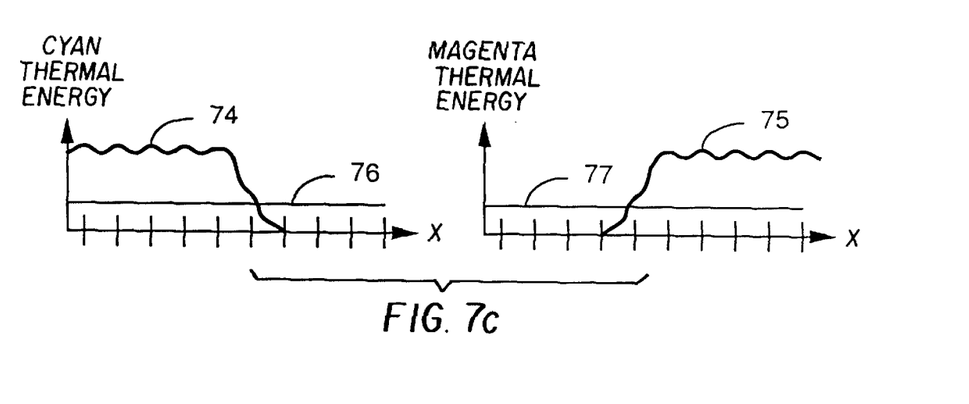
Figure 7D:
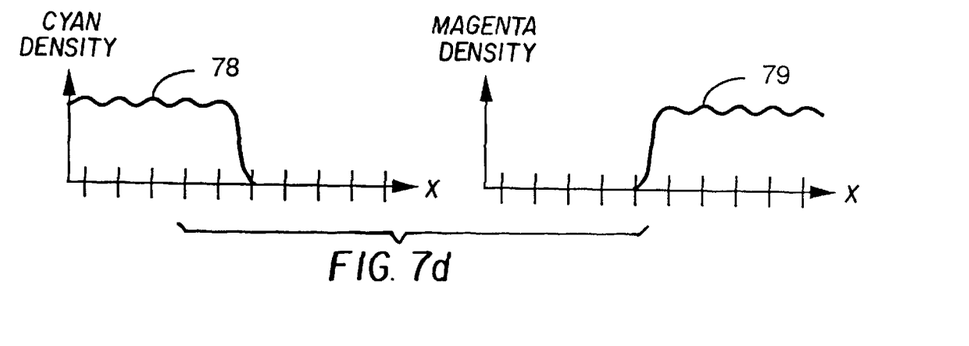
Figure 8:
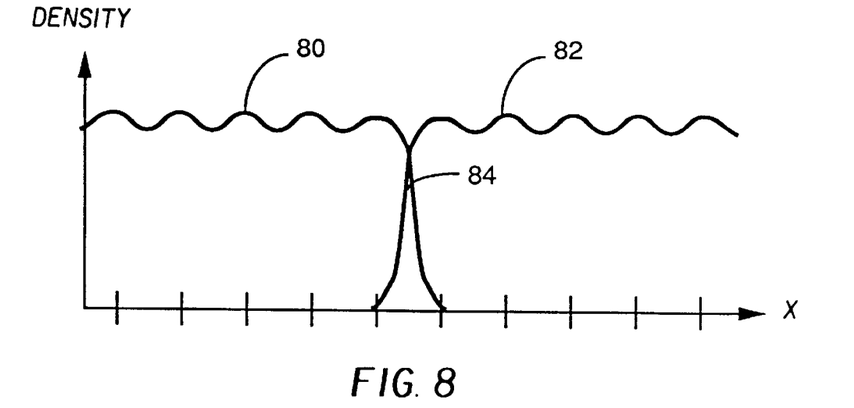
FIG. 8 is a diagram showing the edge characteristics resulting from the steps of FIG. 6.

To demonstrate why the method of this invention reduces the edge artifacts in a digital printer, consider FIGS. 7(a)–(d), which are parallel to FIGS. 2(a)–(d) except that the edge pixels have been modified according to the above disclosed method. FIG. 7(a) shows graphs of the cyan image content 70, and the magenta image content 71, as a function of the image position x. For x positions to the left, there is cyan image content, but no magenta image content. For x positions to the right, the opposite is true. The corresponding cyan pixel values 72 and magenta pixel values 73 after they have been modified by the method of the present invention are shown in FIG. 7(b). It can be seen that the pixels that are found on the light side of the edge have been modified by adding a pixel correction value so that the modified pixel value is intermediate to the pixel values on either side of the edge. If this image were reproduced on a thermal dye transfer color digital printer, the pixel values will be converted into thermal energy applied to the thermal dye donor ribbon to transfer dye to the receiver layer. Figurative representations of the cyan thermal energy 74 and the magenta thermal energy 75 are shown in FIG. 7(c). It can be seen that the modification of the edge pixels effectively broaden the energy profiles of the edges. Also shown on the graphs are the cyan thermal threshold 76 and the magenta thermal threshold 77 corresponding to the thermal energy levels necessary to transfer dye. Energy levels below these thresholds will result in no dye transfer to the receiver layer. The resulting cyan density profile 78 and magenta density profile 79 are shown figuratively in FIG. 7(d). It can be seen that the x location of the edges are much closer to those of the ideal edge profile shown in FIG. 7(a) than the prior art example shown in FIG. 2. This is shown more clearly in FIG. 8 which superimposes the cyan density profile 80, and the magenta density profile 82. Examination of the boundary 84 between the cyan patch and the magenta patch reveals that the white line edge artifact found in FIG. 3 has been greatly reduced. For any given printer it is necessary to optimize the form of the difference signal functions and the pixel correction formula so that the white line artifact can be reduced as much as possible without the introduction of an undesirable amount of edge overlap.

One drawback associated with the above forms for the pixel correction formula is that there will be a tendency to fill in single pixel wide white lines on a solid background. This is due to the fact that the pixel correction formula does not know the difference between a white line and a white edge. A second embodiment of the present invention includes a useful modification of the pixel correction formula which will prevent any modification of single pixel wide lines:

$$\Delta=\max(\Delta LR, \Delta AB) \qquad (5)$$

where $$\Delta LR=|\Delta L-\Delta R| \qquad (6a)$$

$$\Delta AB=|\Delta A-\Delta B| \qquad (6b)$$

Assuming that the left and right difference signal functions are identical, the values of $\Delta L$ and $\Delta R$ will be equivalent if the center pixel occurs in the middle of a single pixel wide vertical white line. As a result, the value of $\Delta LR$ will go to zero. Likewise, the values of $\Delta A$ and $\Delta B$ will be zero so that the value of $\Delta AB$ will also be zero. Therefore it can be seen that the resulting pixel correction value will be zero so that the center pixel value will be unchanged. However, if the center pixel occurs on the light side of a vertical edge, either $\Delta R$ or $\Delta L$ will be zero, and the other will be large. In this case, consideration of Eqs. (5) and (6) shows that the resulting pixel correction value will be identical to the one that would be obtained with the original functions shown in Eqs. (1) and (2). As a result, the same desirable effect on edges will be obtained without the undesirable effect on single pixel wide white lines.

Although the pixel correction formula shown in Eqs. (5) and (6) prevents any undesirable effects on single pixel wide lines, slightly wider white lines can still be adversely affected. In order to design a process which can mitigate any undesirable effects, it will be necessary to make use of a larger pixel neighborhood than that shown in FIG. 5. This is due to the fact that it is impossible to detect wider lines without information about the pixels straddling the line. A third embodiment of the present invention which detects two pixel wide lines and reduces the amount of correction accordingly will be presented. It will be apparent to one skilled in the art that this approach can be generalized to address yet wider lines, or other types of image features. The need for such extensions will be dependent upon the characteristics of the particular printer.

Figures 9, 10:
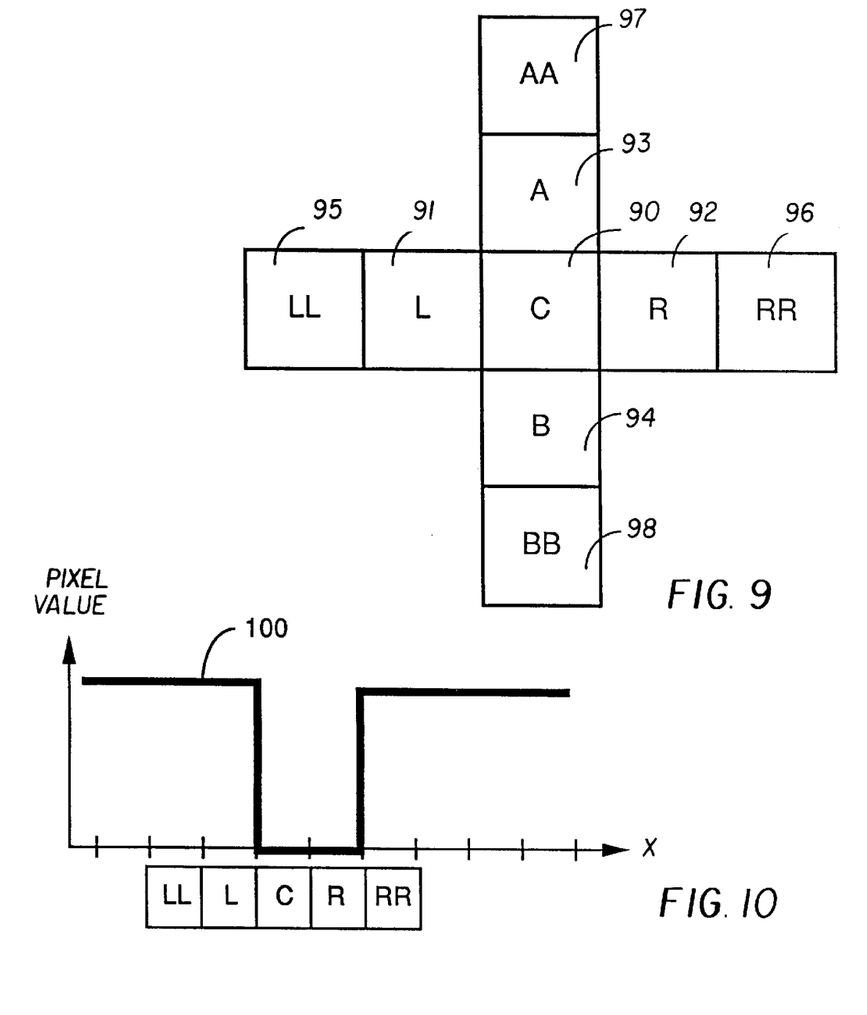
FIG. 9 is a diagram showing a group of neighboring pixels around a center pixel including secondary pixels.
FIG. 10 is a graph illustrating a two pixel wide line.

For this illustration consider the pixel neighborhood shown in FIG. 9. A center pixel 90 is shown together with the neighboring left 91, right 92, above 93, and below 94 pixels. Also shown are the neighboring pixels which are one more pixel away from the center pixel. Namely the second left pixel 95, the second right pixel 96, the second above pixel 97, and the second below pixel 98. The second embodiment of the present invention presented above can be modified slightly to reduce the effects on two pixel wide lines, while still preventing any modification of single pixel wide lines. In this case, the pixel correction formula is given by $$\Delta=\max(\Delta LR', \Delta AB') \qquad (7)$$

where $$\Delta LR'=|\Delta L'-\Delta R'| \qquad (8a)$$

$$\Delta AB'=|\Delta A'-\Delta B'| \qquad (8b)$$

The quantities $\Delta L'$, $\Delta R'$, $\Delta A'$, and $\Delta B'$ are computed from the values of $\Delta L$, $\Delta R$, $\Delta A$, and $\Delta B$ along with the quantities $$\Delta LL=f_L(LL-L) \qquad (9a)$$

$$\Delta RR=f_R(RR-R) \qquad (9b)$$

$$\Delta AA = f_A(AA-A) \quad (9c)$$

$$\Delta BB = f_B(BB-B) \quad (9d)$$

The computation of ΔL', ΔR', ΔA', and ΔB' involves checking for a second edge that is two pixels away from any edge that is found when checking the center pixel. If a second edge is found, the size of the ΔL, ΔR, ΔA, and ΔB quantities are then modified. This can be done using the following tests:

if (ΔL>0 and ΔR=0 and ΔRR>0) then  (10a)
    ΔL'=$S_L$ΔL
else
    ΔL'=ΔL if (ΔR>0 and ΔL=0 and ΔLL>0) then  (10b)
    ΔR'=$S_R$ΔR
else
    ΔR'=ΔR if (ΔA>0 and ΔB=0 and ΔBB>0) then  (10c)
    ΔA'=$S_A$ΔA
else
    ΔA'=ΔA if (ΔB>0 and ΔA=0 and ΔAA>0) then  (10d)
    ΔB'=$S_B$ΔB
else
    ΔB'=ΔB where $S_L$, $S_R$, $S_A$, and $S_B$ are scale factors that are applied to reduce the values of ΔL, ΔR, ΔA, and ΔB. To illustrate the effect of these calculations consider the example shown in FIG. 10. A plot of the pixel value 100 as a function of the position x is shown for a two pixel wide line. If the center pixel C is currently being processed, and is aligned with the left pixel of the two pixel wide line, the neighboring pixels LL, L, R, and RR will be aligned as shown. In this example, the value computed for ΔL would be positive since C is on the light side of an edge. The value of ΔR however would be zero since there is no edge present between the pixels C and R. Using the previous embodiment of this invention, the value of C would have been modified in accordance with the conclusion that C was on an edge. However using Eq. (10a) it can be seen that since ΔRR will be positive due to the presence of a second edge between the pixels R and RR, the value of ΔL would be scaled by the left scale factor $S_L$ thereby reducing the amount of correction applied. Typical values for the scale factors would range from 0 to 1. It can therefore be seen that this third embodiment of the present invention will apply full correction to edges, will apply no correction to single pixel wide lines, and will apply an intermediate level of correction for two pixel wide lines.

The invention has been described in detail with particular reference to certain preferred embodiments thereof, but it will be understood that variations and modifications can be effected within the spirit and scope of the invention.

Parts List
10 inner square
12 outer square
14 edge artifact
20 cyan image content
21 magenta image content
22 cyan pixel values
23 magenta pixel values
24 cyan thermal energy
25 magenta thermal energy
26 cyan thermal threshold
27 magenta thermal threshold
28 cyan density profile
29 magenta density profile
30 cyan density profile
32 magenta density profile
34 edge artifact
40 difference signal computing step
42 pixel correction value determining step
44 new center pixel value computing step
50 center pixel
52 left pixel
54 right pixel
56 above pixel
58 below pixel
60 difference signal function
70 cyan image content
71 magenta image content
72 cyan pixel values
73 magenta pixel values
74 cyan thermal energy
75 magenta thermal energy
76 cyan thermal threshold
77 magenta thermal threshold
78 cyan density profile
79 magenta density profile
Parts List Continued
80 cyan density profile
82 magenta density profile
84 boundary
90 center pixel
91 left pixel
92 right pixel
93 above pixel
94 below pixel
95 second left pixel
96 second right pixel
97 second above pixel
98 second below pixel
100 image content

We claim:

1. A method for reducing edge artifacts produced when printing a digital image on a digital printer, which printer is capable of producing multiple output levels, said digital image being represented as a rectangular array of pixels, comprising the steps of:

a) computing difference signals between a center pixel value and pixel values of a set of one or more neighboring pixels;

b) determining a pixel correction value responsive to the computed difference signals;

c) computing a new center pixel value by modifying the center pixel value using the pixel correction value; wherein the pixel correction value Δ is computed by the formula $$\Delta = \max(\Delta L, \Delta R, \Delta A, \Delta B)$$

where
    max( ) is a function returning the value of the argument with the largest value;

$$\Delta L = f_L(L-C);$$

$$\Delta R = f_R(R-C);$$

$$\Delta A = f_A(A-C);$$

$$\Delta B = f_B(B-C);$$

L-C is the difference signal between the center pixel and the pixel immediately to the left of the center pixel;

R-C is the difference signal between the center pixel and the pixel immediately to the right of the center pixel;

A-C is the difference signal between the center pixel and the pixel immediately above the center pixel;

B-C is the difference signal between the center pixel and the pixel immediately below the center pixel;

$f_L$, $f_R$, $f_A$, and $f_B$ are functions used to process the difference signals between the center pixel and the left, right, above, and below pixels, respectively;

C is the pixel value of the center pixel;

L is the pixel value of the pixel immediately to the left of the center pixel;

R is the pixel value of the pixel immediately to the right of the center pixel;

A is the pixel value of the pixel immediately above the center pixel; and

B is the pixel value of the pixel immediately below the center pixel.

2. The method of claim 1 wherein the digital image is a color plane of a color digital image.

3. The method of claim 1 wherein the neighboring pixels include four pixels, which pixels are immediately to the left of the center pixel, immediately to the right of the center pixel, immediately above the center pixel, and immediately below the center pixel.

4. The method of claim 1 wherein the functions used to process the difference signals are non-zero only when its associated neighboring pixel is darker than the center pixel.

5. The method of claim 4 wherein the form of the functions used to process the difference signals is given by $$f_X(d_X) = \begin{cases} 0; & d_X \leq d_{thresh,X} \\ K_X\left(\dfrac{d_X - d_{thresh,X}}{d_{max,X} - d_{thresh,X}}\right); & d_X > d_{thresh,X} \end{cases}$$

where

X is either L, R, A, or B;

$d_X$ is the difference signal X-C;

$d_{thresh,X}$ is a threshold difference signal value;

$d_{max,X}$ is the maximum possible difference signal value; and $K_X$ is the value of $f_X(\ )$ for the maximum possible difference signal value.

6. A method for reducing edge artifacts produced when printing a digital image on a digital printer, which printer is capable of producing multiple output levels, said digital image being represented as a rectangular array of pixels, comprising the steps of:

a) computing difference signals between a center pixel value and pixel values of a set of one or more neighboring pixels;

b) determining a pixel correction value responsive to the computed difference signals; and c) computing a new center pixel value by modifying the center pixel value using the pixel correction value; wherein the pixel correction value Δ is computed by the formula:

$$\Delta = \max(\Delta L, \Delta AB)$$

where max( ) is a function returning the value of the argument with the largest value;

$\Delta LR = |\Delta L - \Delta R|$;

$\Delta AB = |\Delta A - \Delta B|$;

$\Delta L = f_L(L-C)$;

$\Delta R = f_R(R-C)$;

$\Delta A = f_A(A-C)$;

$\Delta B = f_B(B-C)$;

L-C is the difference signal between the center pixel and the pixel immediately to the left of the center pixel;

R-C is the difference signal between the center pixel and the pixel immediately to the tight of the center pixel;

A-C is the difference signal between the center pixel and the pixel immediately above the center pixel;

B-C is the difference signal between the center pixel and the pixel immediately below the center pixel;

$f_L$, $f_R$, $f_A$, and $f_B$ are functions used to process the difference signals between the center pixel and the left, right, above, and below pixels, respectively;

C is the pixel value of the center pixel;

L is the pixel value of the pixel immediately to the left of the center pixel;

R is the pixel value of the pixel immediately to the right of the center pixel;

A is the pixel value of the pixel immediately above the center pixel; and

B is the pixel value of the pixel immediately below the center pixel.

7. The method of claim 6 wherein the functions used to process the difference signals are non-zero only when its associated neighboring pixel is darker than the center pixel.

8. The method of claim 6 wherein the form of the functions used to process the difference signals is given by:

$$f_X(d_X) = \begin{cases} 0; & d_X \leq d_{thresh,X} \\ K_X\left(\dfrac{d_X - d_{thresh,X}}{d_{max,X} - d_{thresh,X}}\right); & d_X > d_{thresh,X} \end{cases}$$

where

X is either L, R, A, or B;

$d_X$ is the difference signal X-C;

$d_{thresh,X}$ is a threshold difference signal value;

$d_{max,X}$ is the maximum possible difference signal value; and $K_X$ is the value of $f_{X(\ )}$ for the maximum possible difference signal value.

9. The method of claim 6 further including the step of modifying the computed difference signals responsive to secondary difference signals between the pixel values of the neighboring pixels, and the pixel values of other surrounding pixels.

10. The method of claim 6 wherein the digital printer is a thermal dye transfer printer.

* * * * *